May 1, 1923.
E. ZAMORA
WINDMILL GOVERNOR
Filed Oct. 18, 1921
1,453,427
2 Sheets-Sheet 2
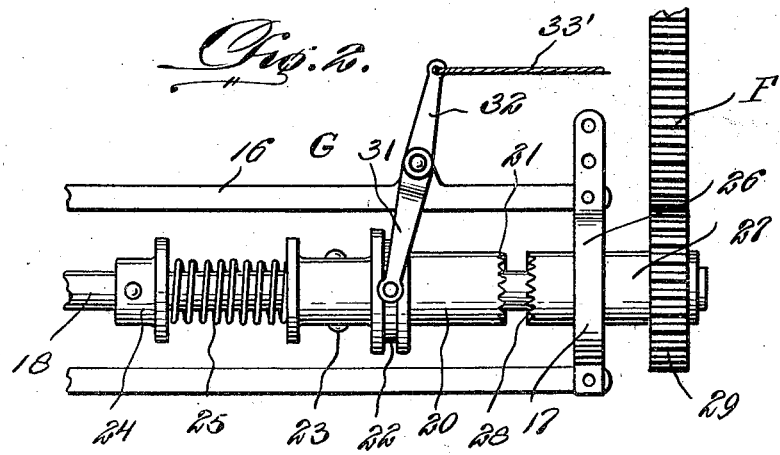
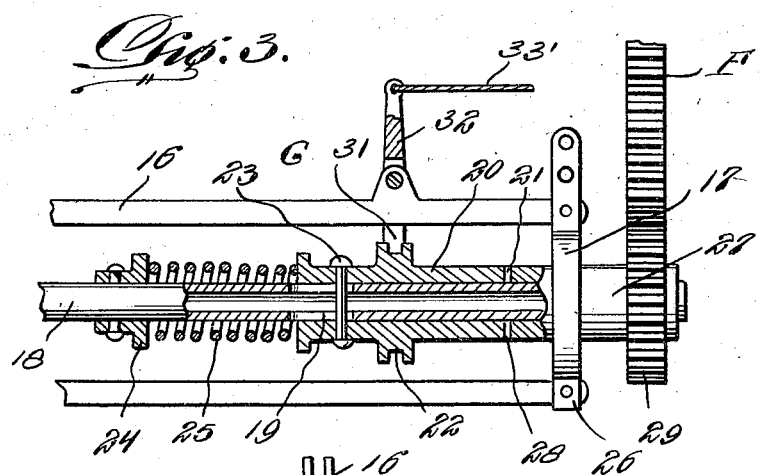
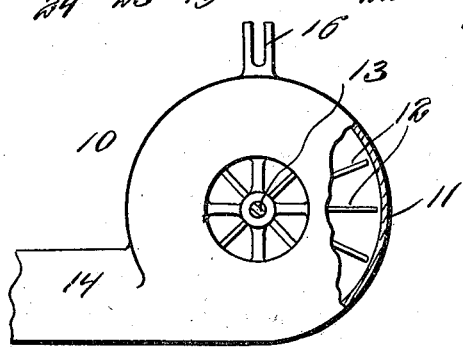
Ernesto Zamora
INVENTOR
BY *Victor J. Evans.*
ATTORNEY Patented May 1, 1923.

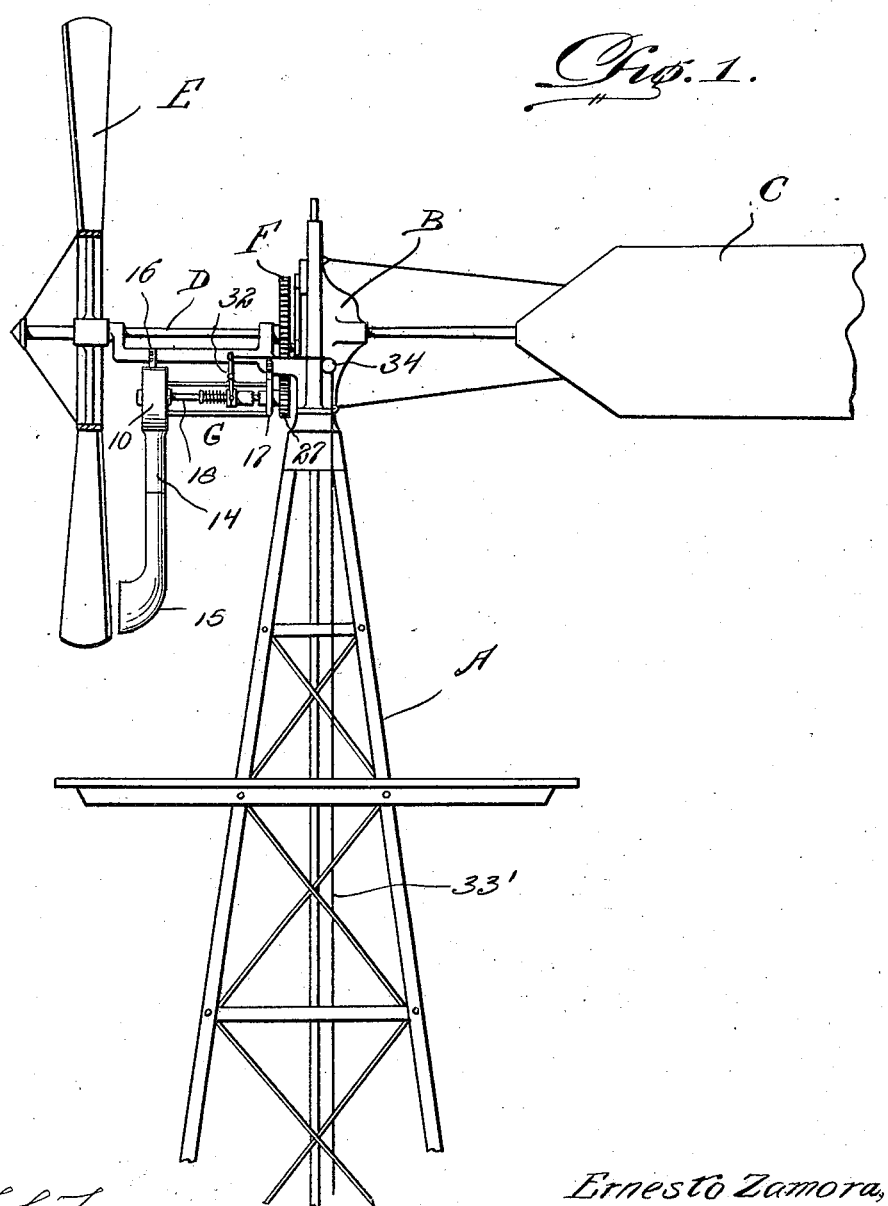

1,453,427

UNITED STATES PATENT OFFICE.

ERNESTO ZAMORA, OF EVA, TEXAS.

WINDMILL GOVERNOR.

Application filed October 18, 1921. Serial No. 508,428.

*To all whom it may concern:*

Be it known that I, ERNESTO ZAMORA, a citizen of the United States, residing at Eva, in the county of Jim Wells and State of Texas, have invented new and useful Improvements in Windmill Governors, of which the following is a specification.

This invention relates to power devices, particularly to wind mills, and has for its object the provision of novel means associated with and operated by rotation of the wind mill whereby to assist or check the wind mill in its movement.

An important and more specific object is the provision of a blower device driven by rotation of the wind mill and having a discharge pipe connected therewith adapted to blow air against the wheel either to assist the wind currents impinging against the wheel or to partially counteract the wind currents for the purpose of retarding the rotation of the wheel in the event that the rotation might be rapid.

Another object is the provision of a novel clutch device associated with the drive means for the blower and capable of operation from the ground or other remote point whereby to effect control of the blower.

An additional object is the provision of a device of this character which will be simple and inexpensive in construction and installation, highly efficient in use, positive in action, durable in service and a general improvement in the art.

With the above and other objects and advantages in view, the invention consists in the details of construction to be hereinafter more fully described and claimed and illustrated in the accompanying drawings in which:—

Figure 1 is a side elevation of the upper portion of a wind mill equipped with my device.

Figure 2 is a detail longitudinal sectional view showing the clutch means for effecting control of the blower, the clutch members being disengaged.

Figure 3 is a similar view showing the clutch members engaged and certain parts thereof being in section.

Figure 4 is a detail view showing the construction of the blower and the remaining figures are detail views.

Referring more particularly to the drawings the letter A designates an ordinary supporting scaffold structure which carries the wind mill head B, this head being provided with a tail C and carrying a shaft D upon which is mounted the usual wind wheel E. The shaft of course carries a gear F which is for the purpose of driving the usual pump mechanism indicated broadly by the letter G.

In carrying out my invention I provide a blower 10 which is of ordinary construction and which includes a casing 11 suitably mounted upon the head B. This blower of course includes the usual series of blades 12 which are secured upon a shaft 13. The outlet end 14 of the blower has connected thereto a tube or pipe 15 which extends downwardly and which is then curved upwardly so that its discharge end will be directed toward the front of the wheel E. Any suitable connection may be interposed in this pipe 15 or it may be mounted in any desired manner so that the discharge end thereof will be arranged at such angle with respect to the front of the wheel that air blown through the tube or pipe 15 will either assist the natural wind currents acting upon the wheel or will tend to counteract such natural currents for the purpose of retarding the rotation of the wheel.

Extending from the blower casing 11 is a support 16 of any preferred construction which is rigidly mounted upon the head B and which is provided with bearings 17 for a shaft 18 which may be formed as a prolongation of the blower shaft or which may be simply rigidly secured thereto by any suitable means. The free end of the shaft 18 is formed with an elongated slot 19 and slidable upon this free end is a sleeve 20 having one end formed with a clutch element 21 and having its other end formed with a grooved collar 22. An opening 23 passes transversely through the sleeve and is slidable along the slot 19. Secured upon the shaft 18 is a suitable collar or stop 24 against which abuts one end of a coiled spring 25 which surrounds the shaft and which has its other end abutting against the collar 22, the purpose of this spring being to urge the clutch member 21 toward the free end of the shaft 18.

The support 16 carries an additional member 26 within which is journaled a short shaft 27 upon one end of which is secured a clutch element 28 adapted to be engaged by the clutch element 21. The other end of this shaft carries a pinion 29 which meshes with the gear F of the wind mill head.

Pivoted upon the support 16 is a fork 31 engaging within the grooved collar 22 and having an extension arm 32 with the free end of which is connected a flexible member 33' which may be a cable, rope or wire and which is threaded about suitable guide pulleys or rollers 34 and extends to any desired location such for instance as the ground near the base of the scaffold structure A.

In the operation of the device it will be seen that ordinarily the clutch elements 21 and 28 are in engagement so that the blower has a positive gear connection with the drive head. When the wheel E is rotating it will be apparent that the gear F meshing with the pinion 29 will cause rotation of the blower blades whereupon air will be forced through the pipe 15 and be discharged against the rear face of the wheel E. In case it is not desired to have the blower in operation, it is merely necessary that the operator pull upon the flexible member 33' which will result in rocking the fork 31 which will slide the sleeve 20 along the shaft 18 to throw the clutch element 21 out of engagement with the clutch element 28 whereupon the drive connection will be broken and the blower will remain inactive.

From the foregoing description and a study of the drawings it will be apparent that I have thus provided a very simply constructed and mounted air pressure producing device associated with and driven by a wind mill and which will efficiently perform all the functions for which it is intended in a highly satisfactory and easily controlled manner.

While I have shown and described the preferred embodiment of the invention, it is of course to be understood that I reserve the right to make such changes in the form, construction and arrangement of parts as will not depart from the spirit of the invention of the scope of the subjoined claims.

Having described the invention what is claimed is:—

1. In combination with a wind mill head including a rotary wind wheel and a power element driven thereby, a blower of the centrifugal type, a pipe connected with the power blower and having its discharge end directed toward the rear side of the wind wheel, and a releasable drive connection between said power element and the blower.

2. In combination with a wind mill head including a rotary wind wheel and a power element driven thereby, a blower of the centrifugal type, a pipe connected with the power blower and having its discharge end directed toward the rear side of the wind wheel, and a releasable drive connection between said power element and the blower, said connection comprising interengaging clutch members and means operable from a remote point for controlling the engagement and disengagement of said clutch members.

3. In combination with a wind mill head provided with a rotary wind wheel and a driving gear rotated thereby, a centrifugal blower mounted upon the head, a pipe connected with the outlet of the blower and having its discharge end directed toward the rear side of said wind wheel, a shaft connected with the rotary element of the blower, a clutch member slidable upon said shaft, a short shaft aligning with said shaft and carrying a pinion meshing with said gear, a clutch member secured upon said short shaft and means operable from a remote point for shifting said slidable clutch element into and out of engagement with said last named clutch element.

In testimony whereof I affix my signature.

ERNESTO ZAMORA.